United States Patent [19]
Vilmann et al.

[11] Patent Number: 4,860,814
[45] Date of Patent: Aug. 29, 1989

[54] STRETCHER FRAME ASSEMBLY

[76] Inventors: James R. Vilmann; Margaret J. D. Vilmann, both of 2033 E. Ramon Rd., No. 3C, Palm Springs, Calif. 92262

[21] Appl. No.: 201,363

[22] Filed: May 27, 1988

Related U.S. Application Data

[63] Continuation of Ser. No. 819,194, Jan. 14, 1986, abandoned.

[51] Int. Cl.⁴ .............................................. D06C 3/08
[52] U.S. Cl. .................................. 160/381; 160/378; 403/402; 38/102
[58] Field of Search ...................... 160/378, 380, 381; 403/231, 383, 403, 402, 295; 38/102.1, 102.91, 102

[56] References Cited

U.S. PATENT DOCUMENTS

| | | |
|---|---|---|
| 2,455,640 | 2/1947 | Ashbaugh . |
| 2,523,383 | 9/1950 | Majkrzak ............... 160/378 |
| 3,841,008 | 10/1974 | Cusick . |
| 3,950,869 | 4/1976 | Samarin . |
| 3,978,905 | 9/1976 | deLama et al. .............. 38/102.91 X |
| 4,409,749 | 10/1983 | Hama . |
| 4,451,997 | 6/1984 | Jones . |
| 4,458,668 | 7/1984 | Sheldon ...................... 403/295 X |

Primary Examiner—Blair M. Johnson
Attorney, Agent, or Firm—Fulwider, Patton, Rieber, Lee & Utecht

[57] ABSTRACT

This invention is directed to a stretcher frame assembly for mounting fabrics such as are used by artists for mounting canvas for painting and other works. The stretcher frame comprises interconnected frame sections having ridges on the inner periphery thereof to which the edges of the fabric are secured by removable means such as spring clips. The stretcher frames are particularly suitable for use in art classes where such frames may be reused.

5 Claims, 1 Drawing Sheet

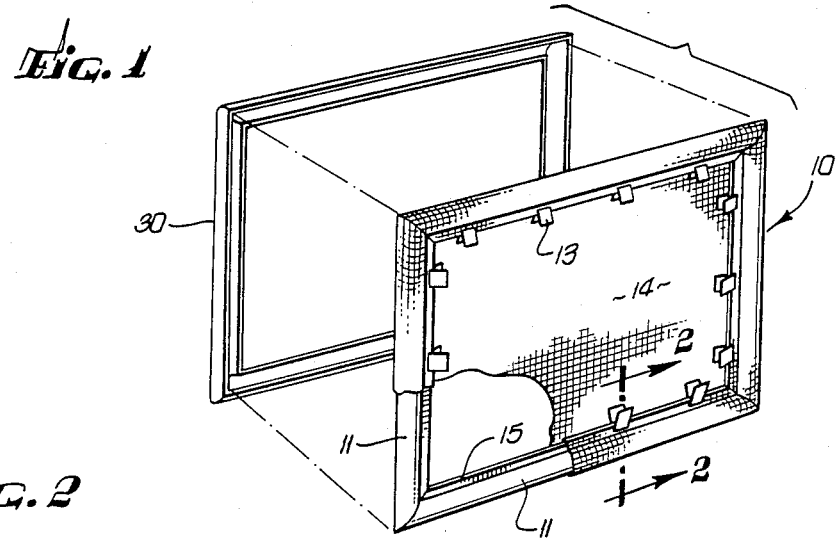
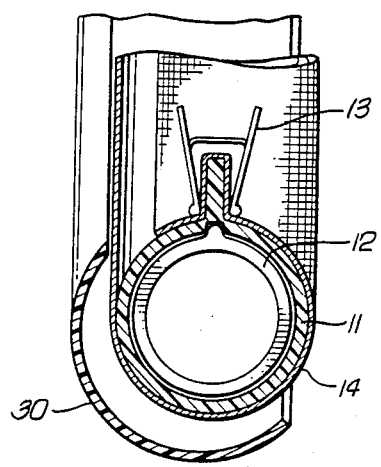
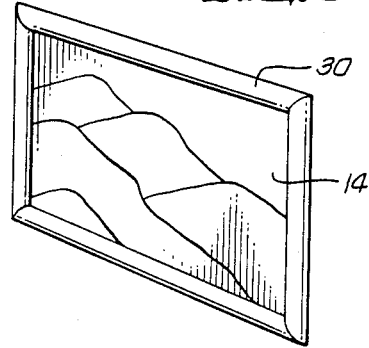
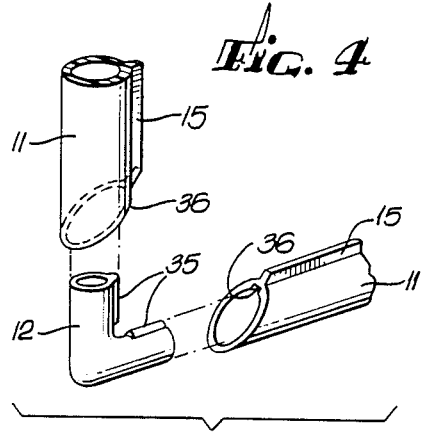
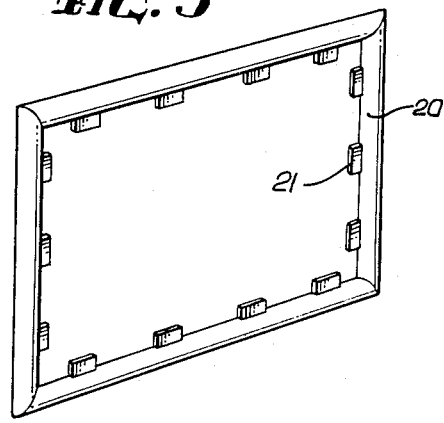

STRETCHER FRAME ASSEMBLY

This application is a continuation of application Ser. No. 819,194, filed Jan. 14, 1986, now abandoned.

BACKGROUND OF THE INVENTION

This invention generally relates to stretcher frames used by artists to mount canvas and other fabrics thereon prior to working on such fabrics.

Painters have traditionally mounted their canvases on rectangularly shaped wood frames by pulling the canvas tautly over the edge of the wooden frame and then tacking or stapling the edge of the canvas to the back side of the wood frame. Similar frames have also been used to mount silk and nylon fabric for silk screening.

Unfortunately, the tacks and staples tend to damage the fabric when mounting and removing the fabric from the frame. As a result, once the fabric was mounted to the stretcher frame, the mounting tends to be permanent because of the inconvenience of removing the tacks and staples in order to remove the fabric from the frame.

In those instances, such as in art classes, where the wooden frames may be used repeatedly, removing the canvas and other fabric can be very burdensome and inconvenient.

Many different types of stretcher frames have been proposed over the years with the prime purpose thereof to eliminate the need for tacking and stapling the fabric to the frame. The following list of patents disclose some of these prior devices. The list is intended to be exemplary not exhaustive on the subject.

| U.S. Pat. No. 2,455,640 | Ashbaugh | December 7, 1948 |
| U.S. Pat. No. 3,841,008 | Cusick | October 15, 1974 |
| U.S. Pat. No. 3,950,869 | Samarin | April 20, 1976 |
| U.S. Pat. No. 4,409,749 | Hamu | October 18, 1983 |

One characteristic common to all of the above described prior art stretcher frames, other than the conventional rectangularly shaped wooden frame, is that they have not met with much commercial success. They have either been too inconvenient or too expensive or both. As a result, painters and other artists, for the most part, still use the rectangularly shaped wooden frames which have been used for hundreds of years.

There has been a long felt need for stretcher frame assemblies which are both simple to use and reuse and still be inexpensive. The present invention satisfies this need.

SUMMARY OF THE INVENTION

This invention is directed to an improved stretcher frame on which fabrics such as canvas and silk can be easily and quickly mounted and from which they can quickly and easily be removed without damaging the fabric. Moreover, the stretcher frames can be reused without the need for any refurbishing thereof.

The stretcher frame assemblies in accordance with the invention generally comprise a plurality of frame sections, usually four, innerconnected to form an annular frame structure. The individual frame sections are provided with a ridge or projection on the inner periphery thereof which extends inwardly toward the center of the frame. The ridge or projection is oriented generally parallel to the plane of the frame and the mounted fabric. One or more clipping means are provided to secure the fabric to the ridge when mounting fabric to the frame.

Preferably, a plurality of clips are used on the ridge means of each of the frame sections because it is difficult to maintain the desired uniform tension on an entire side of the fabric if only one elongated clipping element is used to secure the one side of the fabric to the ridge on an individual frame section.

To mount fabric on, for example, a rectangularly shaped stretcher frame, one edge of the fabric is pulled over the ridge and clips are applied thereto secure the fabric to the frame section. The opposite edge of the fabric is pulled tautly over the ridge on the opposite frame section and clipped thereto to secure the fabric thereto. The adjacent sides of the fabric are attached in the same or similar manner. Usually, the fabric is pulled tautly and clipped to the ridge at a plurality of points along the length of each frame section in order to provide the desired tension to the fabric along this edge thereof.

To remove the fabric from the frame, the clips are merely disengaged from the ridge and the fabric and the frame separated.

The ridges on the individual frame sections are, for the most part, parallel to the plane of the frame and/or fabric mounted thereon so that when the clips are employed to secure the fabric to the ridge, the clips did not project outwardly beyond the back plane of the frame.

These and other advantages of the invention will become more apparent from the following detailed description when taken in conjunction with the accompanying exemplary drawings.

BRIEF DESCRIPTION OF THE DRAWINGS

FIG. 1 is an exploded perspective view of a stretcher frame assembly with fabric mounted thereon embodying features of the invention and a companion display frame.

FIG. 2 is a cross-sectional view of the stretcher frame assembly shown in FIG. 1 taken along the lines 2—2.

FIG. 3 is a perspective front view of the display frame and stretcher frame shown in FIG. 1.

FIG. 4 is a perspective view of a corner construction of the stretcher frame which restricts rotational movement of the stretcher frame elements.

FIG. 5 is a perspective view of an alternative embodiment of the invention.

DETAILED DESCRIPTION OF THE INVENTION

Reference is made to FIGS. 1, 2 and 4 which illustrate an annular stretcher frame assembly 10 embodying features of the invention. The stretcher frame 10 assembly comprises frame sections 11 innerconnected by means of elbows 12. A plurality of clips 13 secure fabric 14 onto the ridge elements 15 on the inner side of frame sections 11.

FIGS. 1 and 2 best illustrate securing the fabric 14 to the ridge 15 by means of the spring clips 13. As shown therein, the ridge 15 projects inwardly toward the center of the annular frame 10 and is generally parallel to the plane thereof. The fabric 14 is mounted on frame 10 with the clips 13 positioned out of the way so that they do not become disengaged from the ridge 15, or otherwise interfere with the subsequent handling of the stretcher frame assembly 10. Slight deviations from the parallel relationship could be accommodated provided that the ridge 15 or clip 13 do not project beyond the back plane of the frame assembly 10.

An alternative frame section 20 is shown in FIG. 5 which has a plurality of ridges or projections 21 along the length thereof in those areas where the spring clips 13 are to be used to secure the fabric 14 to the ridges 21.

FIGS. 2 and 3 illustrate the stretcher frame assembly 10 with fabric 14 mounted thereon in conjunction with a display frame 30. The inner surface or contact points of the display frame 30 match the outer surface of the stretcher frame assembly 10 so that the fabric 14 can be displayed while still mounted on the stretcher frame 10. Suitable means (not shown) are provided along the outer edge of the display frame 30 to fit over the back side of the stretcher frame 10 to hold the stretcher frame assembly 10 and the display frame 30 together.

The mountings of the edges of the fabric 14 to the ridges 15 by means of clips 13 are most important on those sides of the stretcher frame where the fabric is pulled tautly over the ridge 15 to put the proper tension on the fabric. Other means may be employed to initially mount the fabric on the opposite sides of the stretcher frame. With rectangular shaped frame assemblies at least two adjacent frame sections must be provided with inner ridges suitable for securing the fabric thereto by clips.

As shown in FIGS. 2 and 4 the stretcher frame assembly 10 can be made as a breakdown unit comprising standard corner sections or elbows 12 with frame sections 11 of various lengths in order to form stretcher frames in a wide variety of sizes. It is also contemplated that the stretcher frame of the invention may take the shape other than rectangular, in which case the corner sections or elbows 12 may have an angle other than 90°. The ends of the corner sections or elbows 12 may be provided with ridges 35 which interfit grooves 36 provided on the interiors of the frame section 11 to properly lock the individual frame sections 11 into position with the elbows 12 when assembling the stretcher frame components to prevent relative rotation thereof.

The stretcher frame 10 and the elbows 12 of the invention can be formed of any suitable plastic, metal or wood materials or combinations thereof. Plastic material such as polyethylene is preferred because it can be easily and inexpensively produced by extruding. Moreover, the ridge can be extended integrally therein. The cross-section of the frame sections 11 while shown hollow and circular in the drawings, may be of any convenient cross-sectional shape and moreover, may be solid instead of hollow as shown. The ridge 15 is shown in the drawings as being integral with the frame section 11; however, the ridge may be a separate element and attached or fixed to the frame section 10 by suitable means.

The stretcher frames of the invention are most suitable for use in art classes where the stretcher frames may be frequently reused by the students, particularly when the frames are made as breakdown units.

Although the clipping means have been described herein in terms of spring clips, it is obvious that different types of clipping means can be employed. various modifications and improvements can be made to the invention without departing from the scope thereof.

What is claimed is:

1. A readily assembled stretcher assembly for mounting a sheet of fabric thereon, comprising:
   a frame structure having a front and rear plane for tautly mounting a sheet of fabric over the front plane thereof;
   interconnected open-ended tubular frame sections which are secured together by means of angled elements interfitting with the ends of the frame sections to form said frame structure in a manner preventing rotational movement therebetween;
   a plurality of fixed, rigid inwardly projecting planar ridges, each extending parallel to and between the front and rear plane and disposed around and secured to an inner perimeter of the frame structure and having inner rims over which the edges of the fabric are to be secured; and
   each frame section of the frame structure having a plurality of individual clamping means which are removable from the assembled frame structure and which clamp over the ridges on said frame sections the peripheral edges of fabric, to be mounted, which edges are folded over the inner rims of the inwardly projecting ridges without penetration thereby when said fabric is manually tightened thereover, the removable clamping means being disposed between the front and rear planes of the frame structure thereby avoiding interferring with the placement of the stretcher assembly.

2. The stretcher frame of claim 1 wherein the frame sections are innerconnected into a rectangular shape.

3. The stretcher frame of claim 1 wherein each of said frame sections has a plurality of inwardly projecting ridges spaced along the length thereof.

4. The stretcher frame assembly of claim 1 wherein the clamping means to secure fabric to the ridges comprise spring clips.

5. The stretcher frame of claim 1 wherein the angled elements and frame sections are provided with matching ridges and grooves to mechanically interlock when interconnected to prevent relative rotation between the angled elements and the frame sections.

* * * * *